United States Patent
Ye et al.

(10) Patent No.: US 12,194,637 B2
(45) Date of Patent: Jan. 14, 2025

(54) IMITATION LEARNING AND MODEL INTEGRATED TRAJECTORY PLANNING

(71) Applicant: Baidu USA, LLC, Sunnyvale, CA (US)

(72) Inventors: Zhixian Ye, Santa Clara, CA (US);
Qiangqiang Guo, Seattle, WA (US);
Liyang Wang, Sunnyvale, CA (US);
Liangjun Zhang, Cupertino, CA (US)

(73) Assignee: Baidu USA LLC, Sunnyvale, CA (US)

( * ) Notice: Subject to any disclaimer, the term of this patent is extended or adjusted under 35 U.S.C. 154(b) by 249 days.

(21) Appl. No.: 17/963,017

(22) Filed: Oct. 10, 2022

(65) Prior Publication Data

US 2024/0131705 A1  Apr. 25, 2024

(51) Int. Cl.
*G06F 17/00* (2019.01)
*B25J 9/16* (2006.01)

(52) U.S. Cl.
CPC .............. *B25J 9/1664* (2013.01); *B25J 9/163* (2013.01)

(58) Field of Classification Search
CPC ................. B25J 9/1664; B25J 9/163; G05B 2219/36442; G05B 2219/39298; G05B 2219/40116; G05B 19/42
USPC ....................................................... 700/245
See application file for complete search history.

(56) References Cited

U.S. PATENT DOCUMENTS 11,409,287 B2 * 8/2022 Zhang ....................... G06N 3/08
12,017,352 B2 * 6/2024 Chadalavada Vijay Kumar .........
B25J 9/1676
2021/0086364 A1 * 3/2021 Handa ................... G06T 1/0014
2021/0223774 A1 * 7/2021 Zhang ................... G05B 13/027
2021/0292998 A1 * 9/2021 Kawamoto ............. E02F 9/261
(Continued)

FOREIGN PATENT DOCUMENTS

CN      114723020 A   *   7/2022   ............. B25J 13/08
CN      115330055 A   *   11/2022  ............. E02F 3/437
(Continued)

OTHER PUBLICATIONS

Task-unit based trajectory generation for excavators utilizing expert operator skills (Year: 2023).*
(Continued)

*Primary Examiner* — Ronnie M Mancho
(74) *Attorney, Agent, or Firm* — Oppedahl Patent Law Firm LLC

(57) ABSTRACT

Presented herein are embodiments of a two-stage methodology that integrates data-driven imitation learning and model-based trajectory optimization to generate optimal trajectories for autonomous excavators. In one or more embodiments, a deep neural network using demonstration data to mimic the operation patterns of human experts under various terrain states, including their geometry shape and material type. A stochastic trajectory optimization methodology is used to improve the trajectory generated by the neural network to ensure kinematics feasibility, improve smoothness, satisfy hard constraints, and achieve desired excavation volumes. Embodiments were tested on a Franka robot arm equipped with a bucket end-effector. Embodiments were also evaluated on different material types, such as sand and rigid blocks. Experimental results showed that embodiments of the two-stage methodology that comprises combining expert knowledge and model optimization increased the excavation weights by up to 24.77% with low variance.

18 Claims, 15 Drawing Sheets

(56) References Cited

U.S. PATENT DOCUMENTS

| | | | | |
|---|---|---|---|---|
| 2022/0126445 A1* | 4/2022 | Zhu | ........................ | B25J 9/1635 |
| 2022/0134537 A1* | 5/2022 | Chadalavada Vijay Kumar | ......... | B25J 9/163 700/250 |
| 2023/0036849 A1* | 2/2023 | Lu | ........................... | E02F 9/262 |

FOREIGN PATENT DOCUMENTS

| | | | | |
|---|---|---|---|---|
| EP | 4083335 A2 * | 11/2022 | .............. | E02F 3/437 |
| WO | WO-2019142229 A1 * | 7/2019 | .............. | B25J 9/163 |

OTHER PUBLICATIONS

B. J. Hodel., "Learning to Operate an Excavator via Policy Optimization," Procedia Computer Science, vol. 140, 2018, [online], [Retrieved Apr. 25, 2024]. Retrieved from Internet <URL: https://www.sciencedirect.com/science/article/pii/S1877050918319744> (376pgs).

I. Kurinov et al., "Automated excavator based on reinforcement learning and multibody system dynamics," IEEE Access, vol. 8, 2020. (9pgs).

S. Dadhich et al., "Machine learning approach to automatic bucket loading," in 24th Mediterranean Conference on Control and Automation (MED), 2016. (13pgs).

R. Sutton et al., "Reinforcement Learning, second edition: An Introduction," ser. Adaptive Computation & Machine Learning series, MIT Press, 2018, [online], [Retrieved Apr. 25, 2024]. Retrieved from Internet <URL: https://books.google.com/books?id=uWV0DwAAQBAJ> (1pg).

F. Torabi et al., "Behavioral Cloning from Observation," Proceedings of the 27th International Joint Conference on Artificial Intelligence, 2018. (8pgs).

J. Fu et al., "Learning robust rewards with adversarial inverse reinforcement learning," arXiv preprint arXiv:1710.11248, 2018. (15pgs).

S. Ross et al., "A reduction of imitation learning and structured prediction to no-regret online learning," arXiv preprint arXiv:1011.0686, 2011. (9pgs).

M. Kalakrishnan et al., "STOMP: Stochastic Trajectory Optimization for Motion Planning," in IEEE International Conference on Robotics & Automation, 2011. (6pgs).

L. Zhang et al., "An autonomous excavator system for material loading tasks," [online], [Retrieved Apr. 24, 2024]. Retrieved from Internet <URL: https://robotics.sciencemag.org/content/6/55/eabc3164> Science Robotics, vol. 6, No. 55, 2021. (5pgs).

D. Jud et al., "Planning and Control for Autonomous Excavation," IEEE Robotics & Automation Letters, vol. 2, No. 4, 2017.(8pgs).

* cited by examiner

_1000_

Sand

Grid Map

Wooden Block

Wooden Block Details

IMITATION LEARNING AND MODEL INTEGRATED TRAJECTORY PLANNING

BACKGROUND

A. Technical Field

The present disclosure relates generally to systems and methods for computer learning that can provide improved automated performance, features, and uses. More particularly, the present disclosure relates to autonomous machinery.

B. Background

The last several years has witnessed a dramatic increase in research and development related to autonomous machinery. Autonomous machinery has been investigated for a number of purposes including autonomous car, autonomous truck, autonomous robots, autonomous drones, and autonomous construction vehicles. The rationale for researching and developing autonomous vehicles varies depending upon the application. For example, self-driving cars aid commuters and drivers. Self-driving trucks reduces the costs associated with transporting goods. Autonomous heavy equipment is useful for both reducing costs and reducing the need for humans to work in dangerous situations.

One such vehicle that has seen autonomation research is excavators. Autonomous excavators may potentially be widely used for many different applications, such as moving earth, rock, or other materials. As one of the most versatile heavy equipment, it has a vast market throughout the world. However, a skillful excavator human operator requires extensive training. At the same time, many operation sites are in remote areas with less convenient infrastructures. Moreover, hazardous work environments can impact the health and safety of the human operators on-site.

An autonomous excavator has the advantage of addressing these challenges and improving the overall working condition. Automated excavation is promising to improve the safety and efficiency of excavators, and trajectory planning is one of the most important techniques. One area of importance is generating good trajectories for autonomous excavator. Generating a trajectory is a complex process, but it is important to generate an optimal trajectory for safe and efficient work.

Accordingly, what is needed are systems and methods that can generate good trajectories for autonomous machinery.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

FIG. 10A depicts sand material, and FIG. 10C depicts wooden block. FIG. 10B depicts terrain visualization using a grid map. FIG. 10D shows sizes of the wooden block.

DETAILED DESCRIPTION OF EMBODIMENTS

Figure 1:
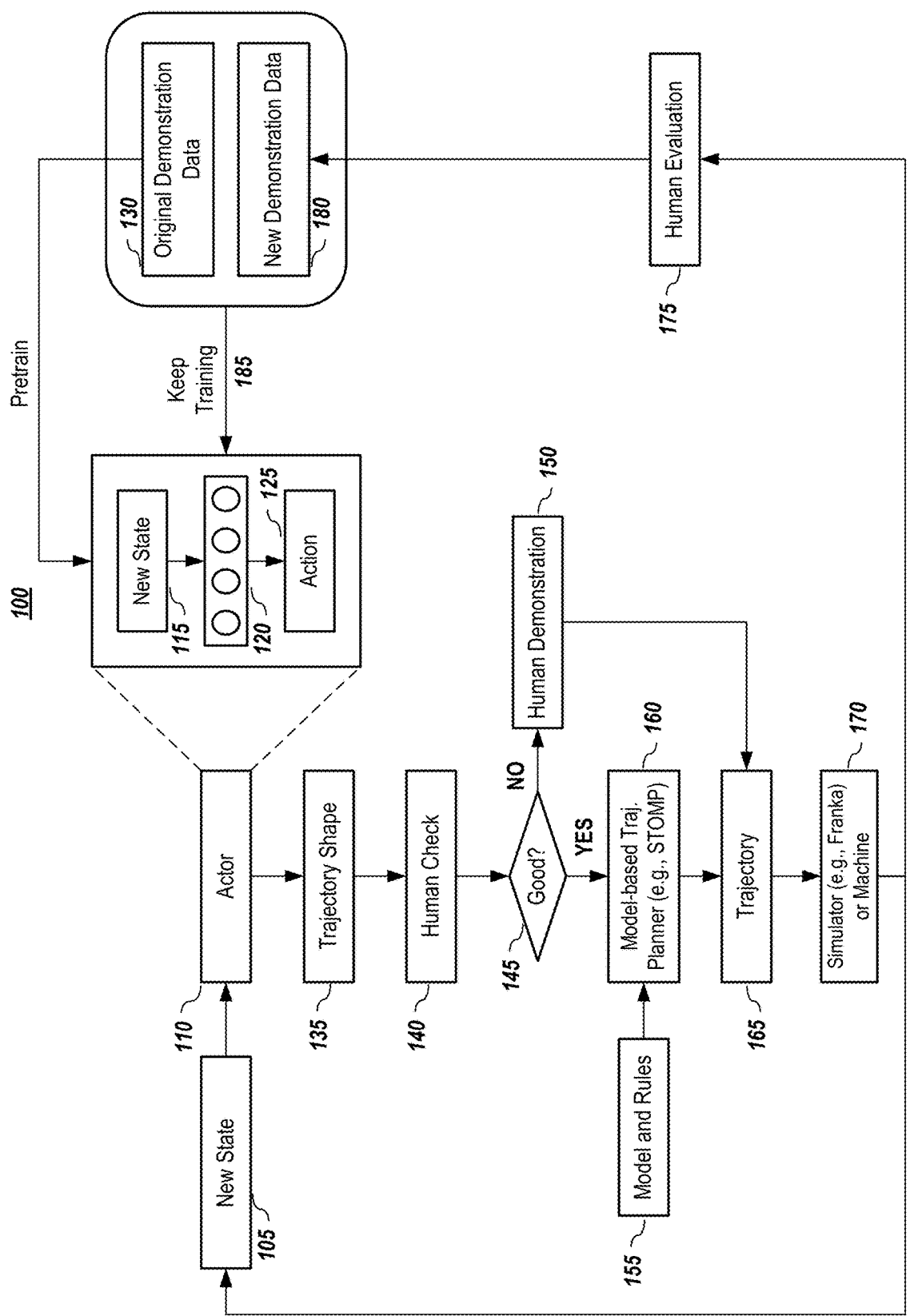
FIG. 1 depicts a framework, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgment, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. The terms "include," "including," "comprise," "comprising," or any of their variants shall be understood to be open terms, and any lists of items that follow are example items and not meant to be limited to the listed items. A "layer" may comprise one or more operations. The words "optimal," "optimize," "optimization," and the like refer to an improvement of an outcome or a process and do not require that the specified outcome or process has achieved an "optimal" or peak state. The use of memory, database, information base, data store, tables, hardware, cache, and the like may be used herein to refer to system component or components into which information may be entered or otherwise recorded. A set may contain any number of elements, including the empty set.

In one or more embodiments, a stop condition may include: (1) a set number of iterations have been performed; (2) an amount of processing time has been reached; (3) convergence (e.g., the difference between consecutive iterations is less than a threshold value); (4) divergence (e.g., the performance deteriorates); (5) an acceptable outcome has been reached; and (6) all of the data has been processed.

One skilled in the art shall recognize that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

It shall also be noted that although embodiments described herein may be within the context of excavators, aspects of the present disclosure are not so limited. Accordingly, aspects of the present disclosure may be applied or adapted for use in other contexts. For example, motion trajectories may be used for a number of devices, including but not limited to robotics, autonomous machines, and autonomous vehicles.

A. General Introduction

Excavators have been widely used in the construction and mining industries. Many excavation tasks are challenging and often need to be conducted under hazardous environments, making it hard for humans to operate the excavators safely and efficiently. With the rise of sensor and computation techniques, autonomous excavators have received more and more attention due to the potential to guarantee safety, increase efficiency, and reduce cost. Technically, there are many aspects, which should be considered in order to develop autonomous excavators: perception, planning, control, system integration, etc. As one of the most important components, excavation trajectory planning is considered in this patent document.

In general, there are two approaches to generate trajectories for autonomous excavators: 1) model-based trajectory planning, and 2) learning-based trajectory planning.

Model-based trajectory planning methods may be further categorized as rule-based and optimization-based. Rule-based planning methods generate trajectories using a set of rules given the current excavation condition. After fine-tuning, rule-based methods can perform reasonably well under specific fixed environments. However, a rule-based method lacks generalization ability, making it hard to be efficiently applied to dynamic environments.

Optimization-based planning methods try to generate trajectories that can minimize (or maximize) certain objectives based on the excavator's kinematic and inverse kinematic dynamic models and the environment information. Such methods are typically able to work under different excavation environments-provided the excavator model is correct and the environment information is sufficient. However, optimization-based methods suffer from at least two disadvantages. First and most importantly, it is usually very difficult to model the interaction dynamics between the excavator and the environment, which makes it hard to accurately optimize the trajectory. Although one may be able to fine-tune a set of empirical parameters to adjust the dynamics, such parameters should be re-tuned when the excavation task changes, e.g., the interaction dynamics should be different between digging sand and digging gravel. Second, an optimization-based trajectory planning problem might have multiple solutions, or the solutions might be different given different initial trajectories, which reduces the stability of the planning process.

Learning-based trajectory planning methods aim to generate excavation trajectories from data, either from self-generated data, i.e., through reinforcement learning (RL), or from real-world expert data, i.e., through imitation learning (IL). The RL methods adopt the concept of agent learning actions under different environments with the aim of maximizing a pre-defined expected cumulative reward through interactions with the environment. Trajectory planning and excavator control are usually coupled in RL methods, i.e., the agent learns the optimal actions (i.e., joint position, velocity, acceleration, or even hydraulic cylinder's pressure) for different states, and such actions make up trajectories. An RL-based excavator control method has been proposed that uses the Proximal Policy Optimization with Covariance Matrix Adaptation (PPO-CMA) algorithm. Simulation results showed that this proposed method could move up to 97% of a predefined mass.

However, there are at least two drawbacks of RL-based methods. First, the agent requires numerous data to fully explore possible actions for different environments, thus lacks data efficiency. Second, consequently, RL-based methods are usually trained in simulation, since it is really time and cost consuming, and even dangerous to train an RL agent in real-world. However, there are usually huge gaps between simulation models and real-world physics, making it hard for RL-based methods to be transferred to real-world applications. The IL-based methods aim to mimic the trajectories generated by human experts. For example, some have proposed a linear regression-based imitation learning model learned from expert wheel loader drivers, and others have tried to improve the data efficiency of the imitation-based control using clustering and association analysis. The main disadvantage of IL-based trajectory planning methods is that, if the expert data cannot cover all environment conditions, or the data is severely biased, the learned policy map may fail under those environments that are rarely encountered. Besides, the expert operations might not be optimal considering that excavation is a very complicated task. In addition, the trajectories generated by such methods may not be feasible, e.g., do not satisfy the inverse kinematics or violate hard constraints, especially when the policy is learned by a neural network.

In this patent document, embodiments of an IL and model integrated method for excavation trajectory planning are presented. Expert trajectories under various environments were first collected, and a policy network from expert data was learned through imitation learning. Then, in one or more embodiments, the learned policy (e.g., in a DAGGER (Dataset Aggregation) fashion) is applied and updated. If the trajectory generated by the policy network is not optimal (as checked by human experts), one or more human experts operate the excavator to finish the excavation task, and the expert trajectories may be added to the dataset of IL. If the experts think that the trajectory is good, it will be used as the reference and the initial trajectory for the lower-level model-based trajectory planning methodology, which improves such a trajectory in terms of satisfying hard constraints, guaranteeing correct kinematics, increasing smoothness, and minimizing user-defined objectives. Finally, the generated trajectory is applied to a real excavator robot, which may be evaluated by experts and added to the dataset of IL.

Some of the contributions includes but are not limited to:

Embodiments of a two-stage methodology for excavation trajectory generation are presented. Embodiments take advantage of the benefits of both model-based and learning-based methods, and avoid their disadvantages, i.e., embodiments get expert trajectory as guidance from IL and make the trajectory feasible/optimal using the model-based method;

Embodiments are able to be generalized for handling different geometry and material types of terrain; and Embodiments were thoroughly tested in real robots across different material environments. The experimental results show that the tested embodiments can increase the excavation weights by up to 24.77%, meanwhile with low variance.

Presented below, the excavation task and embodiments of systems and methodologies are presented in Section B. In Section C, experiment settings, results, and discussions are presented.

B. Embodiments of Systems and Methodologies

A trajectory planning for single excavation is considered given the terrain and the point of attack (POA, the point that excavator bucket first contacts the material). Formally, let s be the state of the environment, which comprises the terrain information and excavator status, and let a be the action, i.e., the trajectory under the current state. A goal is to design a policy framework $\pi(s)$ such that $a=\pi(s)$ is the optimal action under s. Embodiments comprise a two-stage IL and model integrated policy framework $\pi(s)=\pi_{Model}(\pi_{IL}(s))$. A framework embodiment is presented in FIG. 1.

Figure 2:
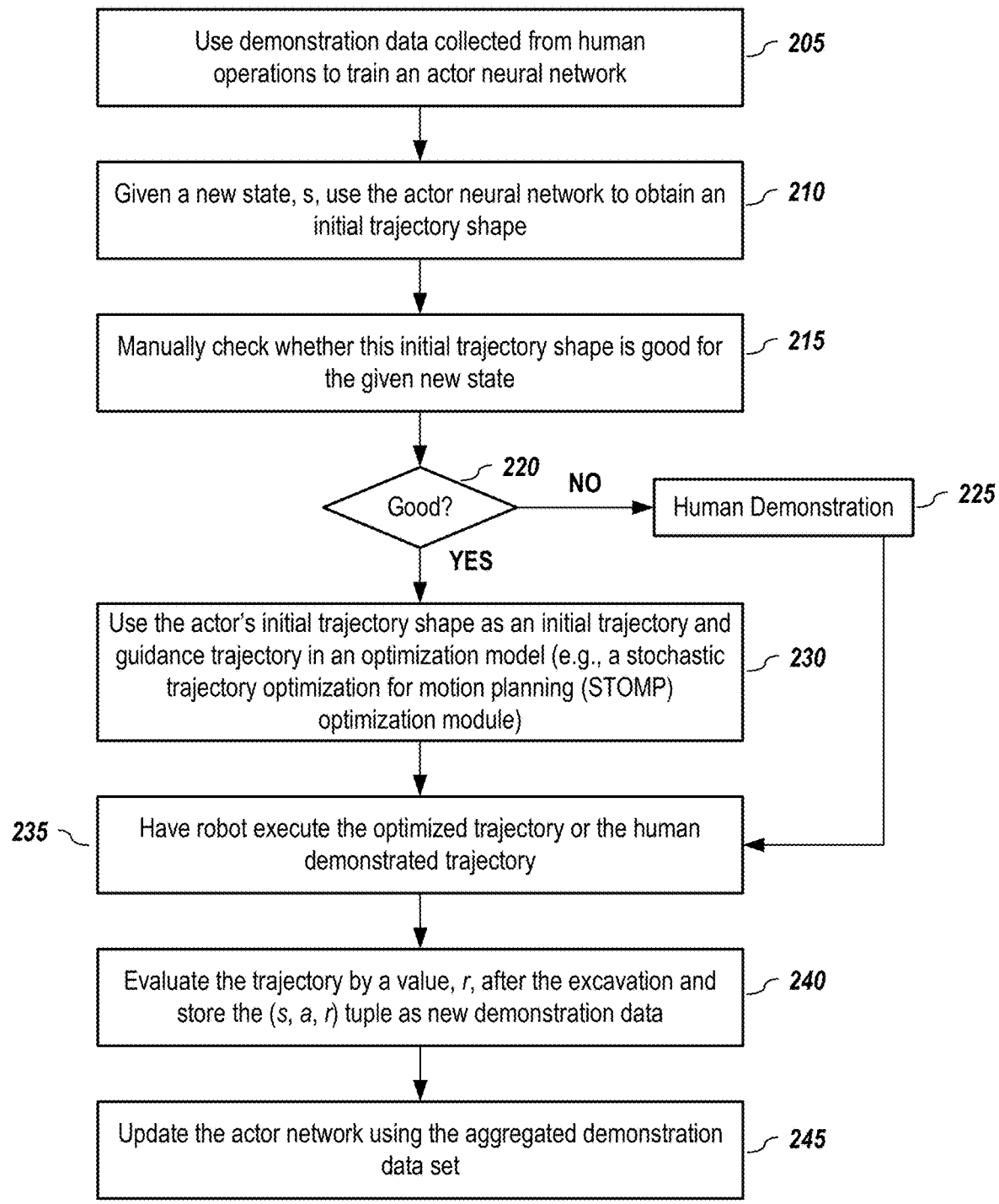
FIG. 2 depicts a methodology for generating an excavator trajectory, according to embodiments of the present disclosure.

FIG. 2 depicts a methodology for generating an excavator trajectory, according to embodiments of the present disclosure. In one or more embodiments, demonstration data 130 collected from human operations is used to train (205) an actor neural network 110/120, which acts as $\pi_{IL}(.)$. Given a new state s 105, an initial trajectory shape 135 is obtained (210) by $\pi_{IL}(s)$ 110. A manual check 140 determines whether this trajectory shape is good or not for the current state may then be performed (215). If the trajectory shape is good 145, it may be used (220) as the initial trajectory and the guidance trajectory in a trajectory motion planning model 160, such as in a stochastic trajectory optimization for motion planning (STOMP) optimization module, which acts as $\pi_{Model}(\pi_{IL}(s))$. In one or more embodiments, the trajectory motion planning model 160 may consider one or more factors (e.g., models and rules 115), such as: the excavator's one or more kinematic models to ensure the feasibility, the hard constraints (such as the excavation boundaries to enhance safety), the smoothness of the trajectory to reduce energy, and one or more user-defined objectives to improve the initial trajectory. The optimized trajectory (which may also be referred to as an operational trajectory) 165 may then be applied (235) to a simulator 170 (e.g., a Franka Panda robot). If the trajectory shape 135 generated by $\pi_{IL}(.)$ 120 is not good, a trajectory may be shown by directly operating 150 the robot (i.e., a human-generated trajectory). Under both conditions, the robot/simulator executes (235) an execution trajectory a (either optimized by the trajectory motion planning model 160 or shown by human 150).

In one or more embodiments, after the excavation, the trajectory is evaluated (240) (e.g., evaluated by a human evaluator 175) and assigned a value r, which may be from 0 (acceptable) to 10 (very good), then the (s, a, r) tuple may be stored (240) as new demonstration data 180. In one or more embodiments, the actor-network is updated (245/185) using the aggregated demonstration data set.

In the following of this section, the definition of the state s, action a, and the structure of the actor neural network $\pi_{IL}(.)$ are first discussed. Then, embodiments of a mechanism of the STOMP methodology are shown as well as how embodiments integrate the trajectory shape, kinematics, hard constraints, and user-defined objectives into it.

1. First Stage: IL-Based Actor Embodiments

In one or more embodiments, terrain information is used as the state s, including geometric shape and material type.

a) Geometric Shape Embodiments

Figure 3:
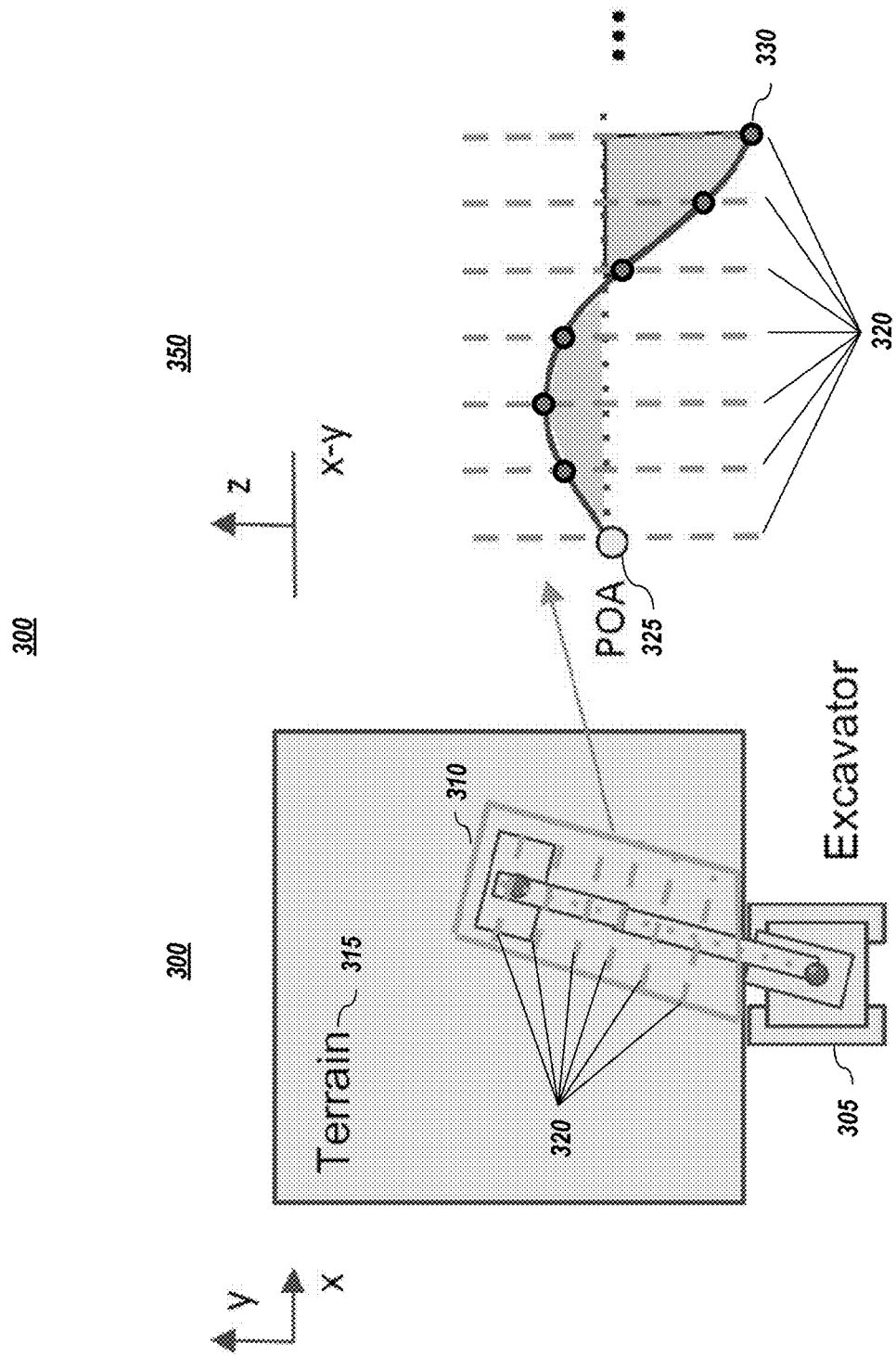
FIG. 3 depicts an illustration of the geometric feature extraction of the excavation-related terrain: top view 300 of the terrain and the excavator 305, and side view 350 of the terrain for feature extraction, according to embodiments of the present disclosure.
Figure 4:
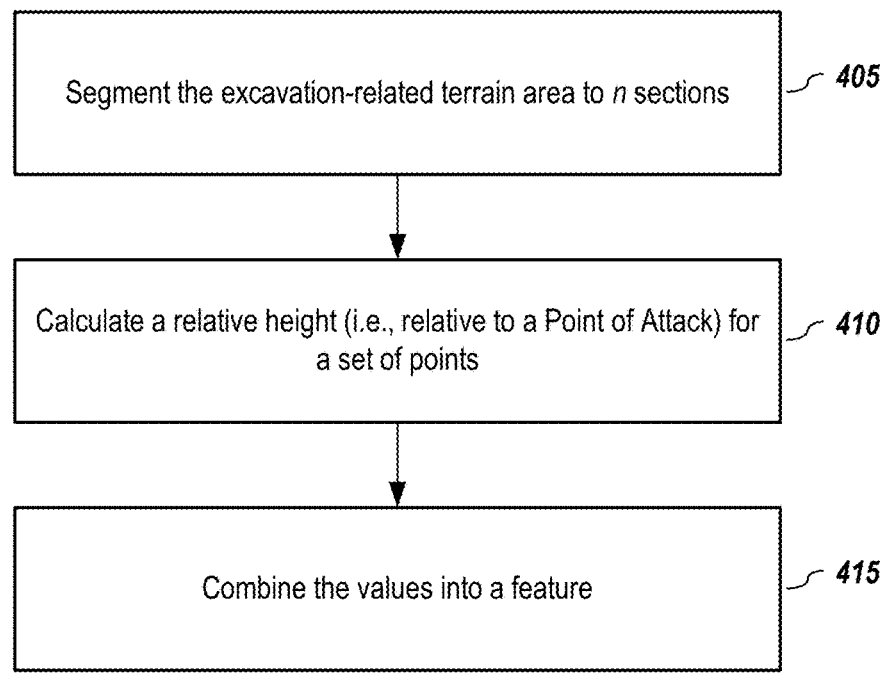
FIG. 4 depicts a method for generating a geometric information feature, according to embodiments of the present disclosure.

For the terrain shape, it may be captured by a grid map in real-world applications. A grid map may be represented by a two-dimensional array, with the size determined by precision. One approach to formulate the geometric information $s_g$ is to directly use the entire grid map. However, such an approach may make the actor-network complicated—e.g., a convolution neural network (CNN) may be required to improve the mapping performance, but it will increase the overall model complexity. And, the large state space typically requires a large amount of data to train the actor-network. Since the excavator base usually does not swing during a single excavation, once the POA is fixed, the excavation process may be viewed as only related to a specific part of the terrain, i.e., the neighbor areas along the straight line between the bucket point and the excavator base. As shown in FIG. 3, in the overall terrain 315 there is the excavation-related terrain, which information handling system is the rectangular or trapezium-shaped area 310. Considering this pattern, a sectional-volume-based state representation may be used. FIG. 4 depicts a method for generating a geometric information feature, according to embodiments of the present disclosure. In one or more embodiments, the excavation-related area or working area 310 may be segmented (405) to n sections 320 (e.g., segmented uniformly although it may be segmented in different ways). For each section, working through each point (e.g., point 330, which represents an intersection between the section demarcation and the terrain surface), a relative height is calculated (410)—i.e., the absolute height of the grid map point minus the absolute height of the bucket point (e.g., the POA 325), and add them up (415) as the feature for that section. For example, in one or more embodiments, since the region of interest (ROI) excavation zone is about a bucket-size width, it usually will cover the ROI area no more than 10 grid-cells (for each row), with resolution of 20 cm per cell for the grid map. So, here the average value of the relative height of these grid-cell on each row may be obtained, and the average height value concatenated as a terrain vector. Here n is the row number of the ROI grid map.

In this way, one obtains a $s_g \in \mathbb{R}^{n\times 1}$ with the terrain information relative to the POA point.

b) Material Type Embodiments

In reality, the material of the terrain may affect the characteristics of the trajectory. Compared with the trajectories for the sand-like material, the trajectories of rocky terrain should be shallower and the trajectory points may be denser (e.g., sampling in the time domain with equal time period). In that case, the material type may be taken into our consideration when generating the trajectories.

Figure 5:
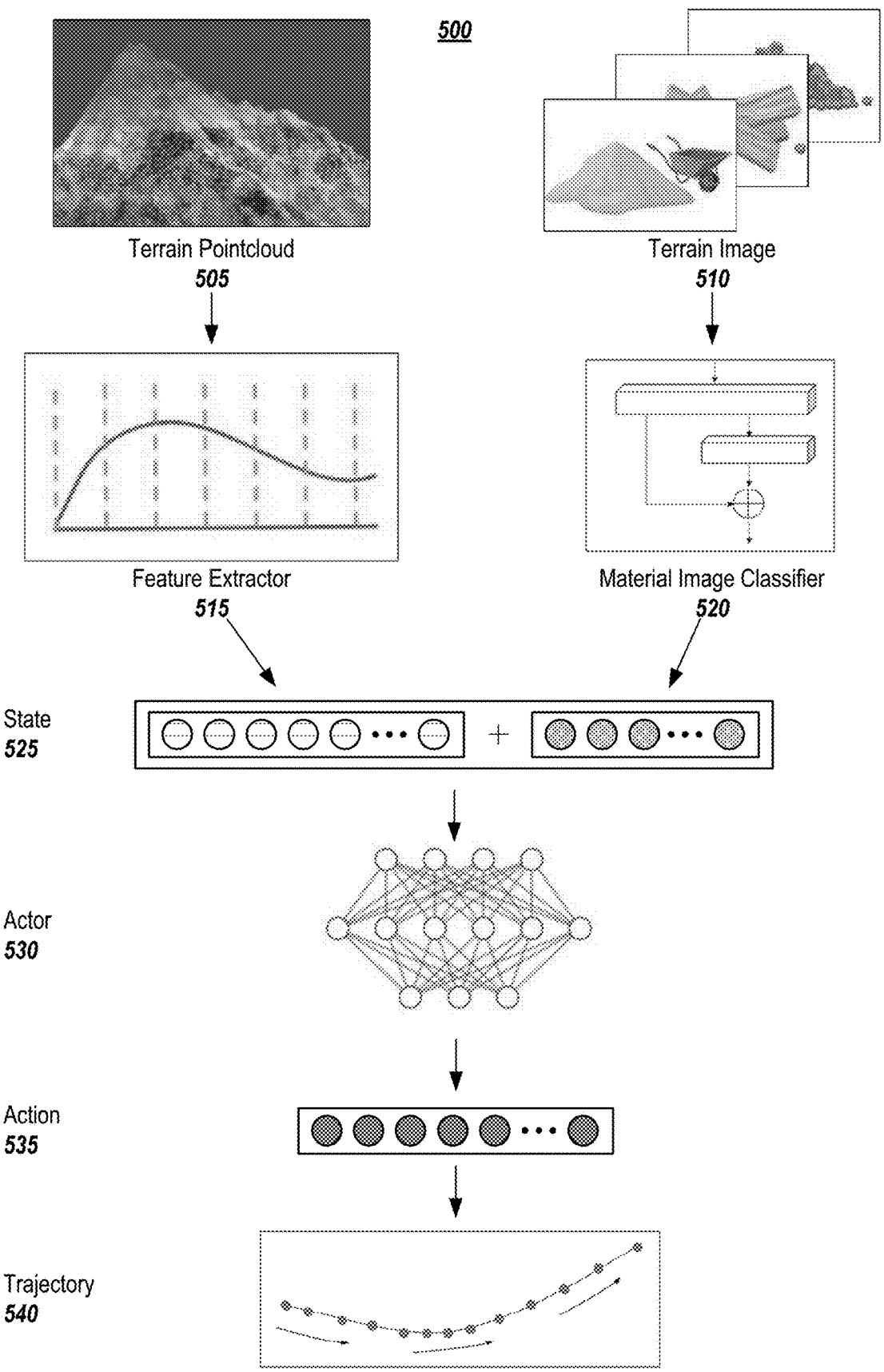
FIG. 5 depicts an architecture for actor trajectory generation, according to embodiments of the present disclosure.
Figure 6:
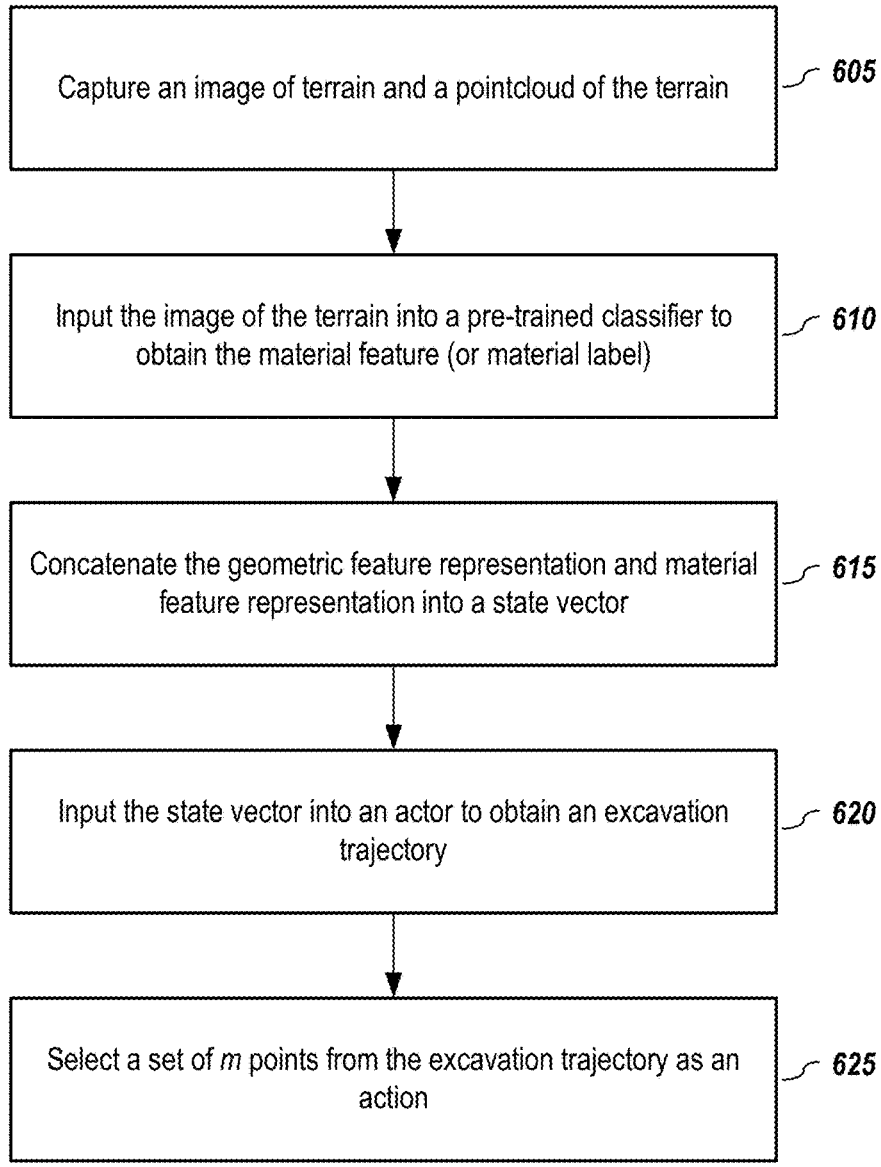
FIG. 6 depicts a methodology for generating a trajectory, according to embodiments of the present disclosure.

FIG. 5 depicts an architecture of actor trajectory generation, according to embodiments of the present disclosure, and FIG. 6 depicts a methodology for generating a trajectory, according to embodiments of the present disclosure. As shown in FIG. 5, in one or more embodiments, a classification model 520 may be incorporated into the whole pipeline 500. For simplicity, an embodiment may capture (605) one image 510 of the terrain while getting a point-cloud 505 of the terrain, which may be captured at the same time, and then input (610) this image into a pre-trained classifier 520 to get the material feature (or material label) $s_m$ for a next stage. As illustrated in FIG. 5, a pointcloud 505 and a feature extractor 515 generate a geometric feature representation. Some example embodiments of how to generate a geometric feature representation are discussed in the prior section.

The state vector or representation 525 may be formed (615) that includes both the geometric and the material information about the terrain. As shown in FIG. 5, the geometric feature representation $s_g$ and material feature representation $s_m$ may be combined into the state vector or representation s 525, which may be denoted as $\{s_g, s_m\}$. In one or more embodiments, the state representation is input into an actor neural network, which may be a multilayer perception (MLP) model (although other types of models may be used), and a trajectory is generated 620. That is, in one or more embodiments, the actor neural network predicts an action, which represents the keypoints of the initial trajectory.

In one or more embodiments, to reduce the network size as well as the training data, embodiments may uniformly (in the time domain) select (620) m points from an excavation trajectory as the action a. Note that a trajectory may be represented by a sequence of 4 joint states (i.e., swing, boom, arm, and bucket), or a sequence of 4 dimensional bucket positions (i.e., x, y, z, and the angle of the bucket point). For this problem, there are no swing operations, indicating the number of joints may be reduced to 3, and the bucket position may be represented by 3 variables (i.e., distance to the excavator base in the x-y plane, z, and the angle of the bucket point). Therefore, one obtains an action, $a \in \mathbb{R}^{3m\times 1}$.

Given the collected demonstration data $D=\{(s_1, a_1), (s_2, a_2), \ldots (s_N, a_N)\}$ where N is the number of demonstrations, the actor neural network $rc_m$ may be trained to minimize the mean square error (MSE) between the demonstration actions and the predicted actions $$\text{(i.e., } \min \frac{1}{N}\sum_i^N (a_i - \pi_{IL}(s_i))^2.$$

As shown in FIG. 1, this actor network may be re-trained when new demonstration data is available. The new demonstration data come with human evaluation (e.g., a value ranging from 0 to 10 which indicates the trajectory is just "acceptable" to "very good"). In one or more embodiments, an importance sampling technique may be used to re-train the actor network. In one or more embodiments, trajectories with higher evaluation values have higher possibilities to be selected.

2. Second Stage: Trajectory Motion Planning Model (e.g., STOMP Optimizer) Embodiments STOMP is a stochastic trajectory optimization method and, in one or more embodiments, may be used as a trajectory motion planning model. It explores the trajectory space by generating random noisy trajectories around an initial trajectory and updates the trajectory based on the cost of candidate trajectories in a probabilistic way. Details of STOMP can be found at M. Kalakrishnan, S. Chitta, E. Theodorou, P. Pastor, and S. Schaal, "STOMP: Stochastic Trajectory Optimization For Motion Planning," in 2011 *IEEE International Conference on Robotics and Automation*, 2011, pp. 4569-4574, which is incorporated by reference herein in its entirety.

In one or more embodiments, STOMP was used as a second stage optimization methodology due to the high flexibility (e.g., no gradient information is needed) and efficiency (e.g., can converge in a small number of iterations once the hyper-parameters are fined tuned). A task for the second stage STOMP optimizer is to improve the trajectory shape given by the first stage IL actor, such that one or more constraints are considered (e.g., the excavator kinematics and hard constraints are satisfied, the trajectory is smooth, the initial trajectory generated by the IL actor is considered, and the user-defined objectives are maximized.

To satisfy the excavator kinematics, a joint state space may be used as the trajectory space. In one or more embodiments, for each iteration, the STOMP generates an updated sequence of joint states, which are guaranteed to satisfy the kinematics and inverse kinematics. Note that the bucket positions may be used to calculate other cost values; in one or more embodiments, the bucket position $p_i=[x_i, y_i, z_i, \alpha_i]$ may be calculated from the joint state of a trajectory point using the kinematics.

In one or more embodiments, embodiments enhance the other three considerations by adding them to the cost functions of STOMP. The hard constraints of the excavation tasks mainly indicate that the materials outside the excavation area should not be touched. For example, if the task is to load a pile of sand standing on the solid ground to a truck, the excavator should not penetrate the ground. If the task is to dig a trench, the excavator should not touch any area outside the interested trench cube. In one or more embodiments, an exponentially increased penalty is added to the violation of hard constraints. Mathematically, let $A \in \mathbb{R}^3$ be the 3-dimensional excavation area, the hard constraint cost for a trajectory point $p_i$ may be defined as follows:

$$c_i^{hc} = \begin{cases} e^{w_{hc} d(p_i, A)}, & \text{if } p_i \notin A \\ 0, & \text{otherwise} \end{cases} \quad (1)$$

where $d(p_i, A)$ is the distance from $p_i$ to A and $w_{hc}$ is the weight. The minimum Euclidean distance is used as the $d(.)$ in one or more embodiments. Larger $w_{hc}$ indicates more rigorous requirements to satisfy the hard constraints.

The smoothness of a trajectory has already been discussed in the STOMP document cited above. In one or more embodiments, a same or similar method is adopted to improve the smoothness, the cost of which is defined as $C^{sm}$, which tries to smooth the trajectory path in terms of acceleration. For example, in one or more embodiments, the smoothness cost may relate to minimizing the expectation related $\theta^T R \theta$, in which R is a positive semi-definite matrix representing control costs and is chosen such that $\theta^T R \theta$ represents the sum of squared accelerations along the trajectory. Note that the capital C indicates this cost is calculated for the entire trajectory.

Although it may not be accurate, the trajectory generated by the IL actor contains valuable guidance for the general trend of the desired trajectory. A goal of STOMP is to improve the trajectory generated by the IL actor. Preferably, the updated trajectory should not deviate from the initial trajectory too much. To enhance the role of the initial trajectory, a penalty may be added for deviating from the initial trajectory. In one or more embodiments, for a trajectory point $p_i$, let $\hat{p}_i$ be the corresponding initial trajectory point, the cost may be defined as:

$$c_i^{in} = w_{in} \|p_i, \hat{p}_i\| \quad (2)$$

In one or more embodiments, user-defined objectives are used to regulate the initial trajectory generated by the IL actor using empirical knowledge so that the updated trajectory is reliable. In one or more embodiments, volume-based knowledge is added to the cost function, e.g., the excavation volume should be a constant value. Ideally, if the interactions between the terrain and the bucket can be accurately modeled, the volume for a trajectory can be precisely calculated. However, it is very difficult to model such interactions, and the computation burden is usually very heavy even if it can be modeled. Accordingly, in one or more embodiments, the volume surrounded by the trajectory and the terrain is used as the volume that can be excavated. Considering the interaction errors, an adjustment factor may be added to the raw volume. After fine-tuning, this method is shown to be quite efficient when the materials are uniform. Let $V_{raw}$ be the raw volume calculated from the trajectory and terrain, $\hat{V}$ be the desired volume, the volume cost may be defined as:

$$C^{vo} = w_{vo} e^{\|V_{raw} - \hat{V}\|} \quad (3)$$

In summary, the trajectory-based cost function for STOMP may be defined as:

$$C^{traj} = C^{sm} + C^{vo} \quad (4)$$

For each trajectory point $p_i$, the point cost function may be defined as:

$$c_i^{point} = c_i^{hc} + c_i^{in} \quad (5)$$

3. Trained Embodiments

Figure 7:
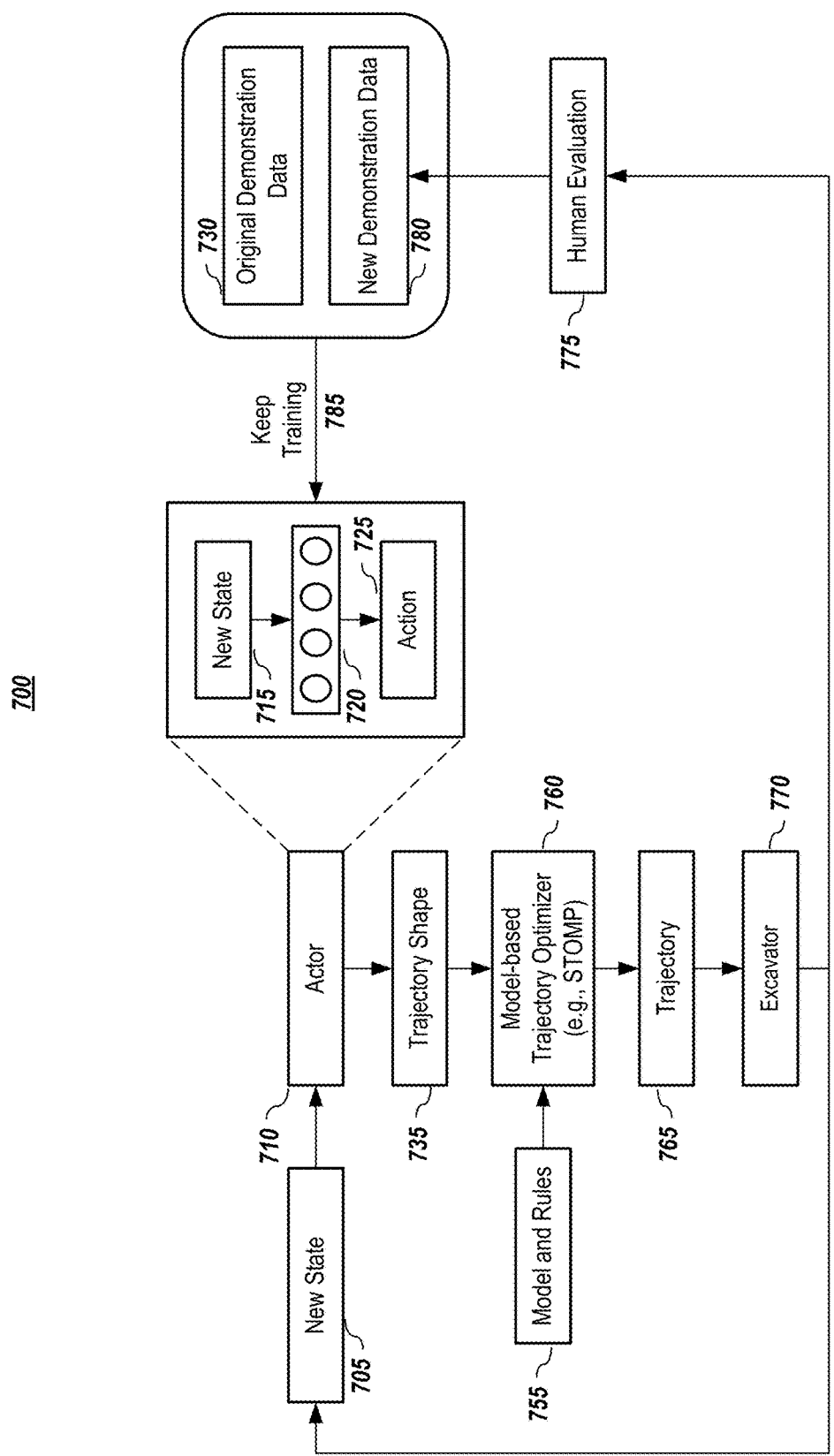
FIG. 7 depicts a framework for a deployed trained system, according to embodiments of the present disclosure.

Once a system has been trained until a stop condition, the trained system may be deployed for use. FIG. 7 depicts a framework for a deployed trained system, according to embodiments of the present disclosure. Note that the framework resembles that discussed with respect to FIG. 1. However, note that the embodiment in FIG. 7 includes that the system may continue to refine with the addition of new data.

Figure 8:
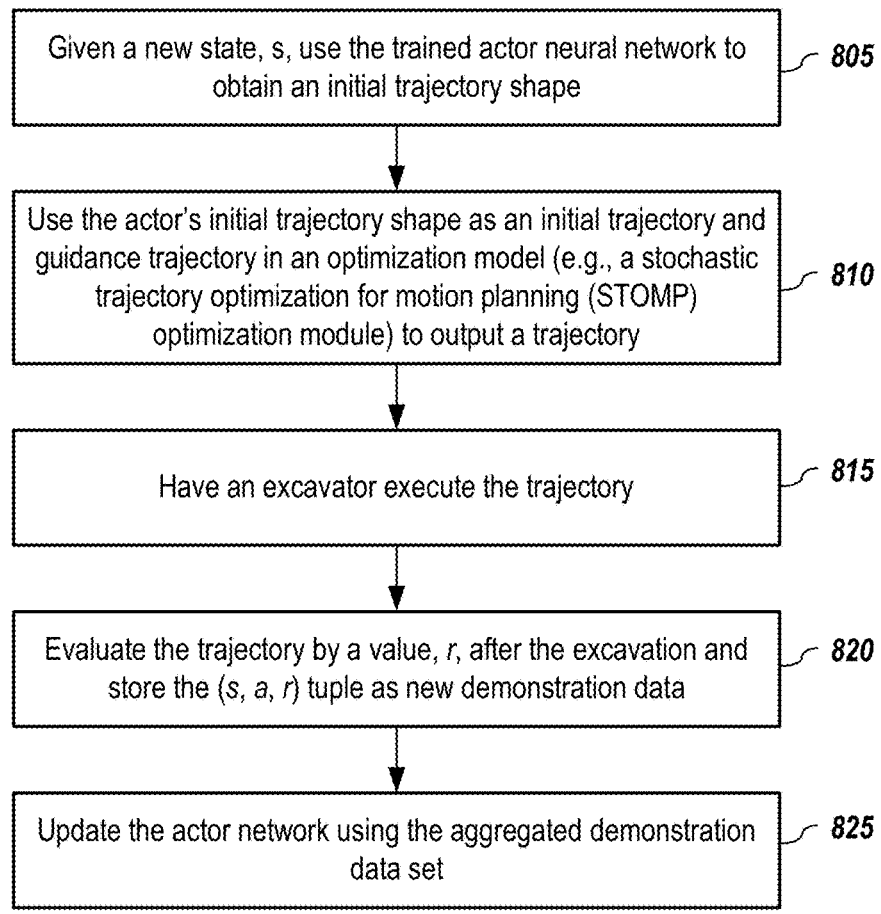
FIG. 8 depicts a methodology for using a trained system, according to embodiments of the present disclosure.

FIG. 8 depicts a methodology for using a trained system, according to embodiments of the present disclosure. In one or more embodiments, given a new state s 705 and given a trained actor neural network 710/720, an initial trajectory shape 735 is obtained (805) by $\pi_{IL}(s)$ 710. The trajectory shape is used (810) as the initial trajectory and the guidance trajectory in a model-based trajectory optimizer 760, such as in a stochastic trajectory optimization for motion planning (STOMP) optimization module, which acts as $\pi_{Model}(\pi_{IL}(s))$. In one or more embodiments, the trajectory motion planning model 760 considers one or more factors (e.g., models and rules 715), such as: the excavator's kinematic models to ensure the feasibility, the hard constraints (such as the excavation boundaries to enhance safety), the smoothness of the trajectory to reduce energy, and some user-defined objectives to improve the initial trajectory. The optimized trajectory 765 may then be executed (815) by an excavator 770.

In one or more embodiments, after the excavation, the trajectory may be evaluated (820) (e.g., evaluated by a human evaluator 775) and assigned a value r, which may be from 0 (acceptable) to 10 (very good), then store (820) the (s, a, r) tuple as new demonstration data 780. In one or more embodiments, the actor-network may be updated (825/785) using the aggregated demonstration data set. It shall be noted that the process may be repeated for a new state.

Figure 9:
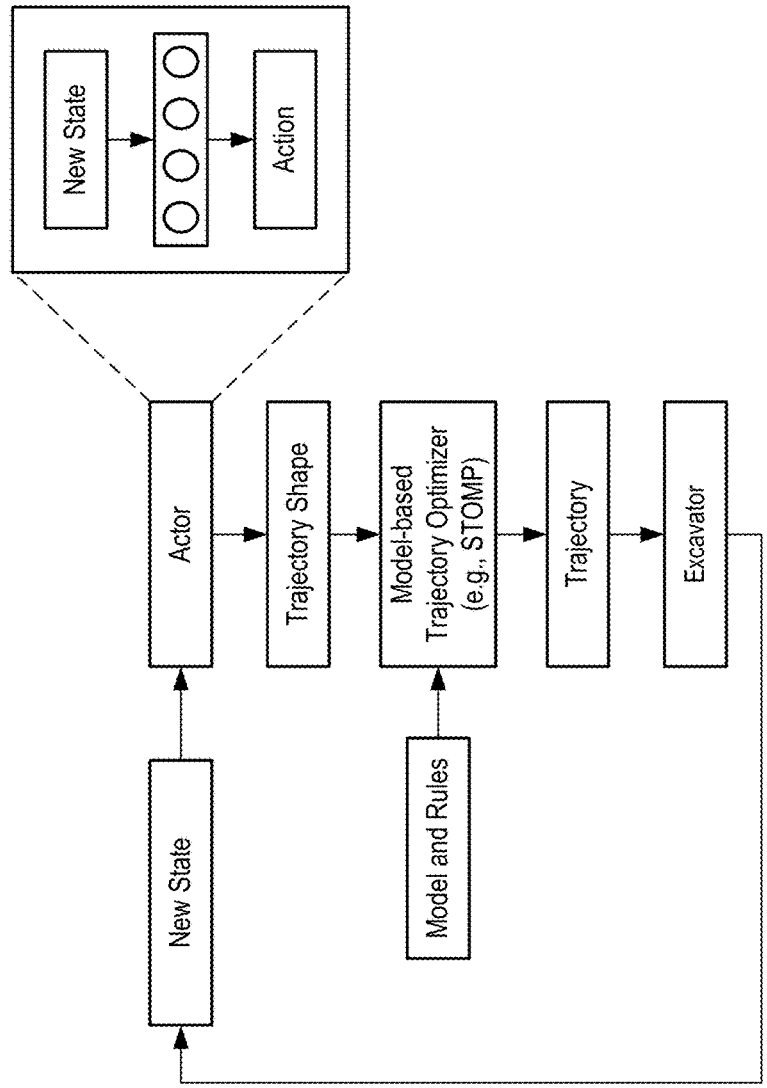
FIG. 9 depicts another framework for a deployed trained system, according to embodiments of the present disclosure.

FIG. 9 depicts another framework for a deployed trained system, according to embodiments of the present disclosure. However, the framework depicted in FIG. 9 includes no human interaction and no supplemental/online training process. Thus, in one or more embodiments, a framework such as one depicted in FIG. 9 may perform the steps of the method depicted in FIG. 8 except steps 820 and 825.

C. Experimental Results

It shall be noted that these experiments and results are provided by way of illustration and were performed under specific conditions using a specific embodiment or embodiments; accordingly, neither these experiments nor their results shall be used to limit the scope of the disclosure of the current patent document.

1. Experiment Settings

Figure 10A:
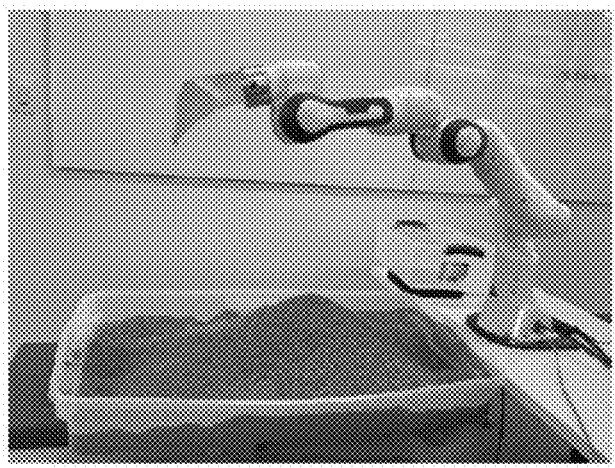
FIG. 10A-D depict experiment settings, including two types of material for experiment, according to embodiments of the present disclosure.
Figure 10B:
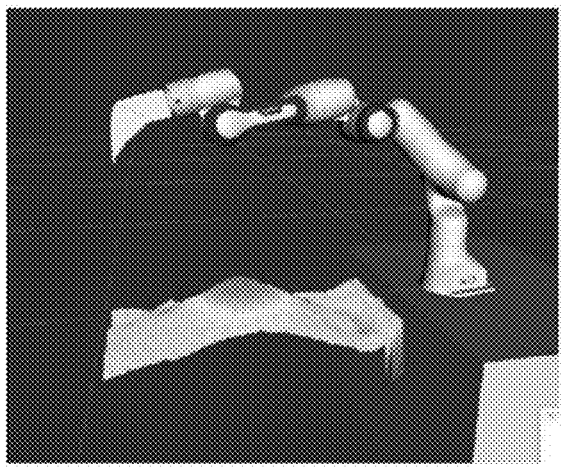
Figure 10C:
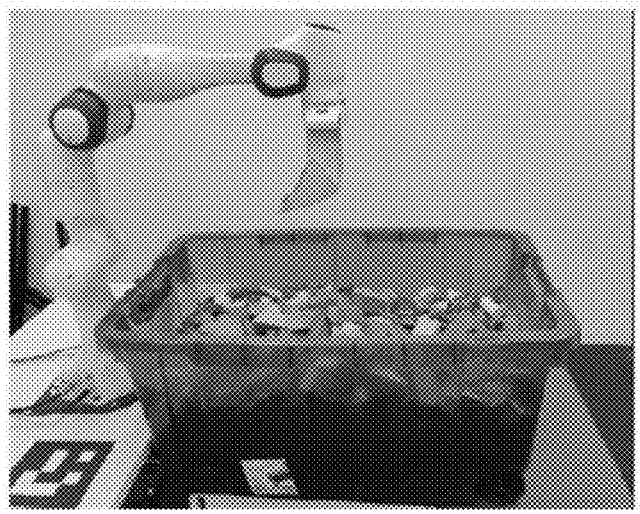
Figure 10D:
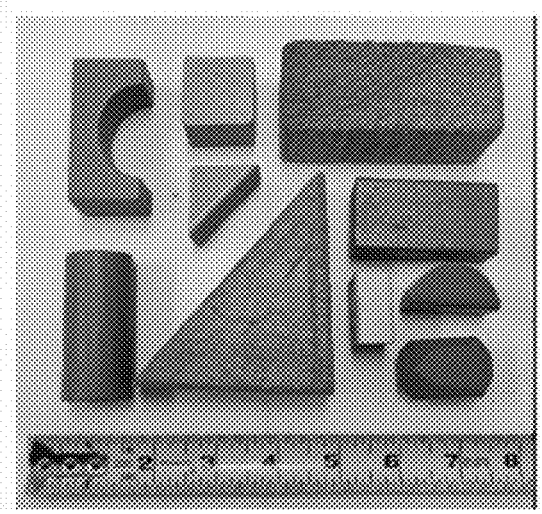

Embodiments were tested on a Franka Panda robot, using sand and wooden blocks as the excavation material. The experiment platform is shown in FIGS. 10A and 10C. Specifically, various sizes of the wooden block were prepared to mimic the real environment as best as can, and the types and sizes of the wooden block are shown in FIG. 10D.

A Microsoft Azure Kinect (produced by Microsoft Corporation of Redmond, Washington, USA) was used to get the point-cloud of the terrain (see FIG. 10B) and transform it into a grid map. The boundary of the excavation area was set as a 0.8 m×0.4 m rectangle in front of the robot base origin with 0.2 m offset.

Three trajectory planning methods were tested: an embodiment (denoted as IL+STOMP), pure imitation learning (denoted as pure-IL), and pure STOMP (pure-STOMP). For the pure-IL learning method, the trajectory generated by the IL actor was not revised and was directly applied to the robot. The action was defined at the bucket space-some points of the trajectory might not satisfy the inverse kinematics. A linear interpolation method was used to complete the trajectory. For pure-STOMP, the initial trajectory generated by the IL actor was not used. Linear initialization was used given the POA and the ending point of the trajectory. During the optimization, testing did not take account of the trajectory deviation cost $c_i^{in}$ since there was no reference trajectory. Other costs and settings were the same as those in IL+STOMP.

Apart from testing on the sand material, experiments also tested an embodiment on the wooden block material to verify various types of actors. Two types of actors were trained, namely, a generic actor and a specialized actor. The generic actor was trained with all the episodes of the data, while the specialized actor was trained with the episodes data containing only one specific type of terrain, such as wooden block material, and its corresponding trajectory. It was desired to see how well the actor embodiment can generalize in different types of material, where the result was compared with the result of using the pure-STOMP method as a baseline.

For each method, three episodes of experiments were conducted. For each episode, each method conducted 15 excavations. This number was based on the observation that it usually takes at least 15 excavations to remove the materials that stands above the zero terrain height. The initial terrain for each episode was set as the same by manually modifying the terrain. Then, a rule-based POA selection method was designed to automatically find the POA. The key idea was to find the highest point of the terrain and set the POA at a certain distance beyond it. This POA selection method did not change for all experiments.

2. Experiment Results and Discussions a) Trajectory Geometric Comparison

Figure 11A:
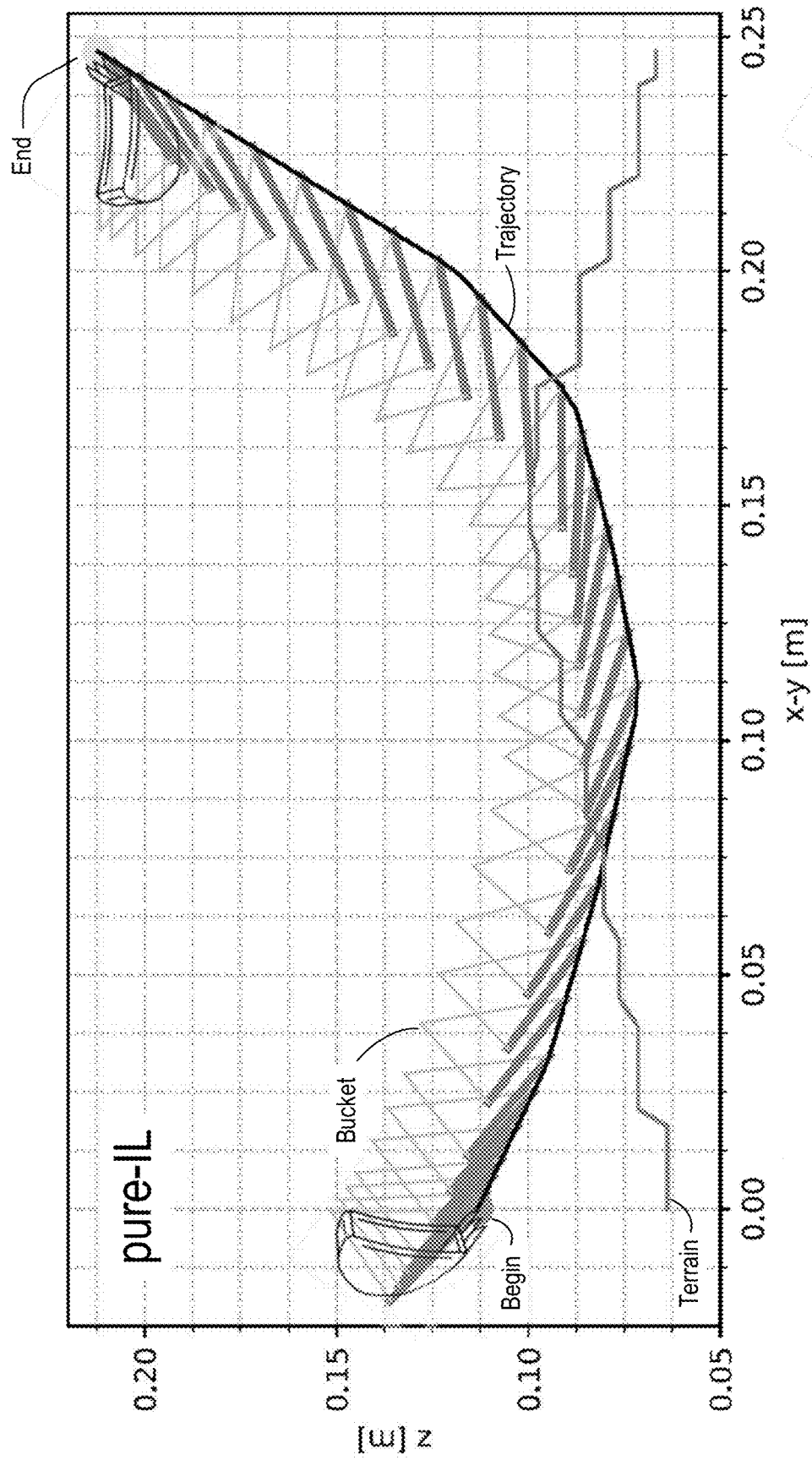
FIGS. 11A-C depict trajectories generated by different methods under the same terrain state.
Figure 11B:
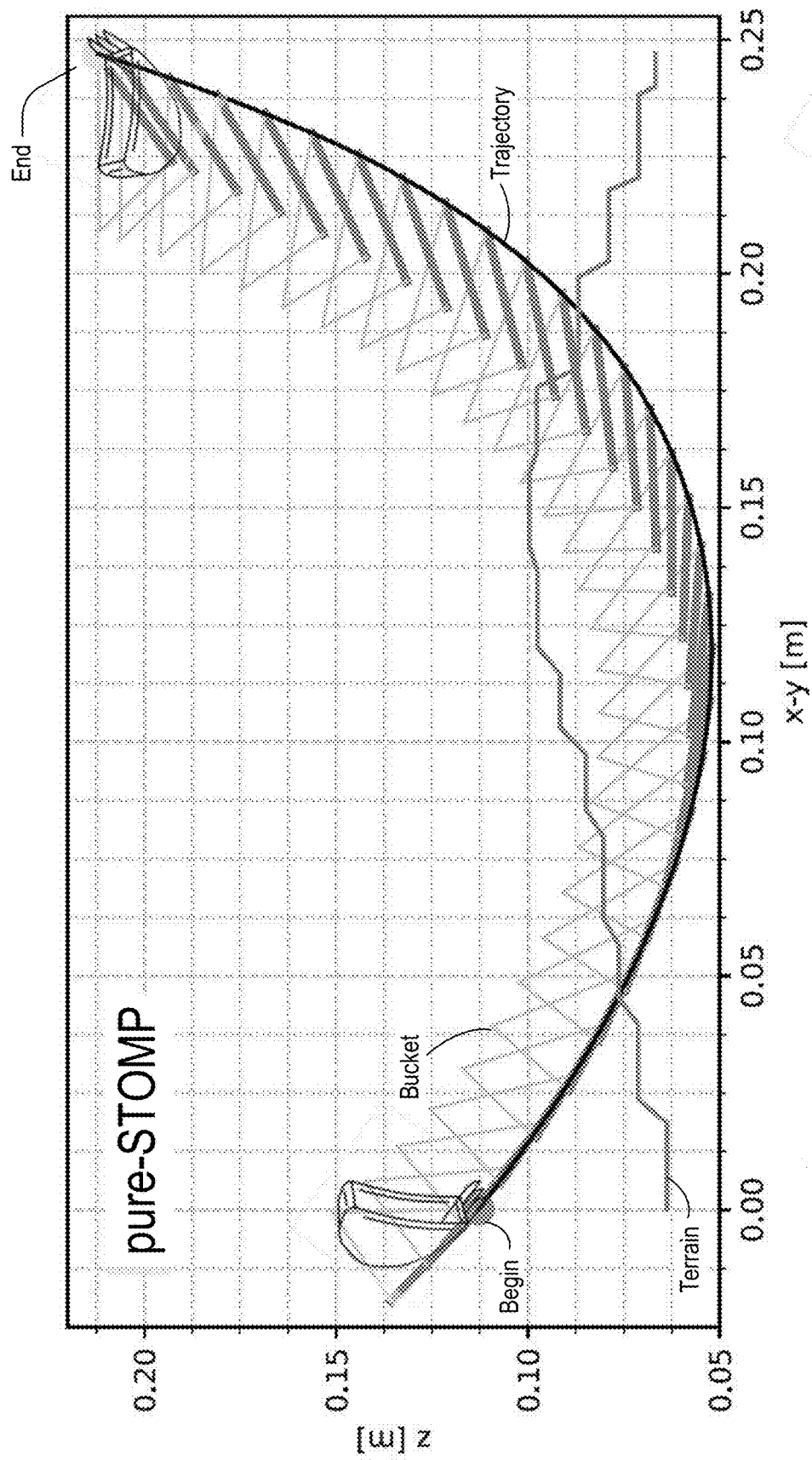
Figure 11C:
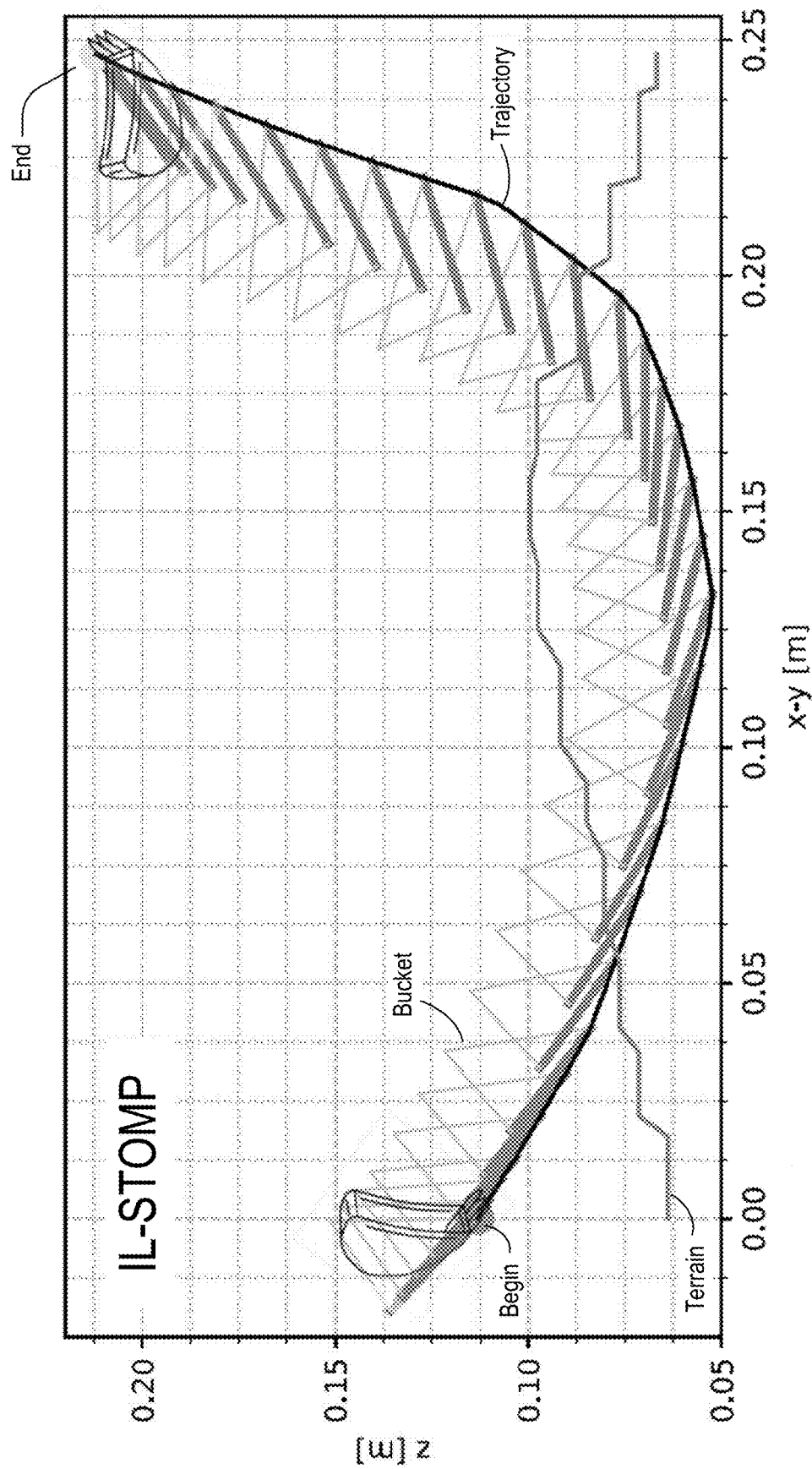

To better illustrate the difference among the three methods, the trajectories given the same terrain state are shown in FIGS. 11A-C.

In FIGS. 11A-C, the terrain lines represent the trajectory of the bucket points, in which the bucket points are at the tips of every solid line of the bucket representation triangles that follows the trajectory. For each subplot, the left-most trajectory point is the POA, and the right most trajectory point is the pre-defined ending point. It can be shown that, compared with pure-IL, the IL+STOMP embodiment excavated more volumes since the area, surrounded by the trajectory and the terrain, is larger. Compared with pure-STOMP, the IL-STOMP embodiment was also supposed to excavate more volumes if they had been applied to the real robot since the bucket angles (i.e., the angle between the thick bucket lines and the x-y axis) of the IL-STOMP embodiment were more reasonable. As shown in the figure, for the IL-STOMP embodiment, the bucket angle reached 0 at the end of the "drag" operation (i.e., the right most area along the 0 terrain), and quickly increased so that the materials could be excavated into the bucket. However, for the pure-STOMP method, the bucket angle changed almost linearly and the bucket lifted up too late—the materials were more likely to be pushed aside instead of excavated into the bucket. This observation was proved by the experiment results in the next section.

Figure 12:
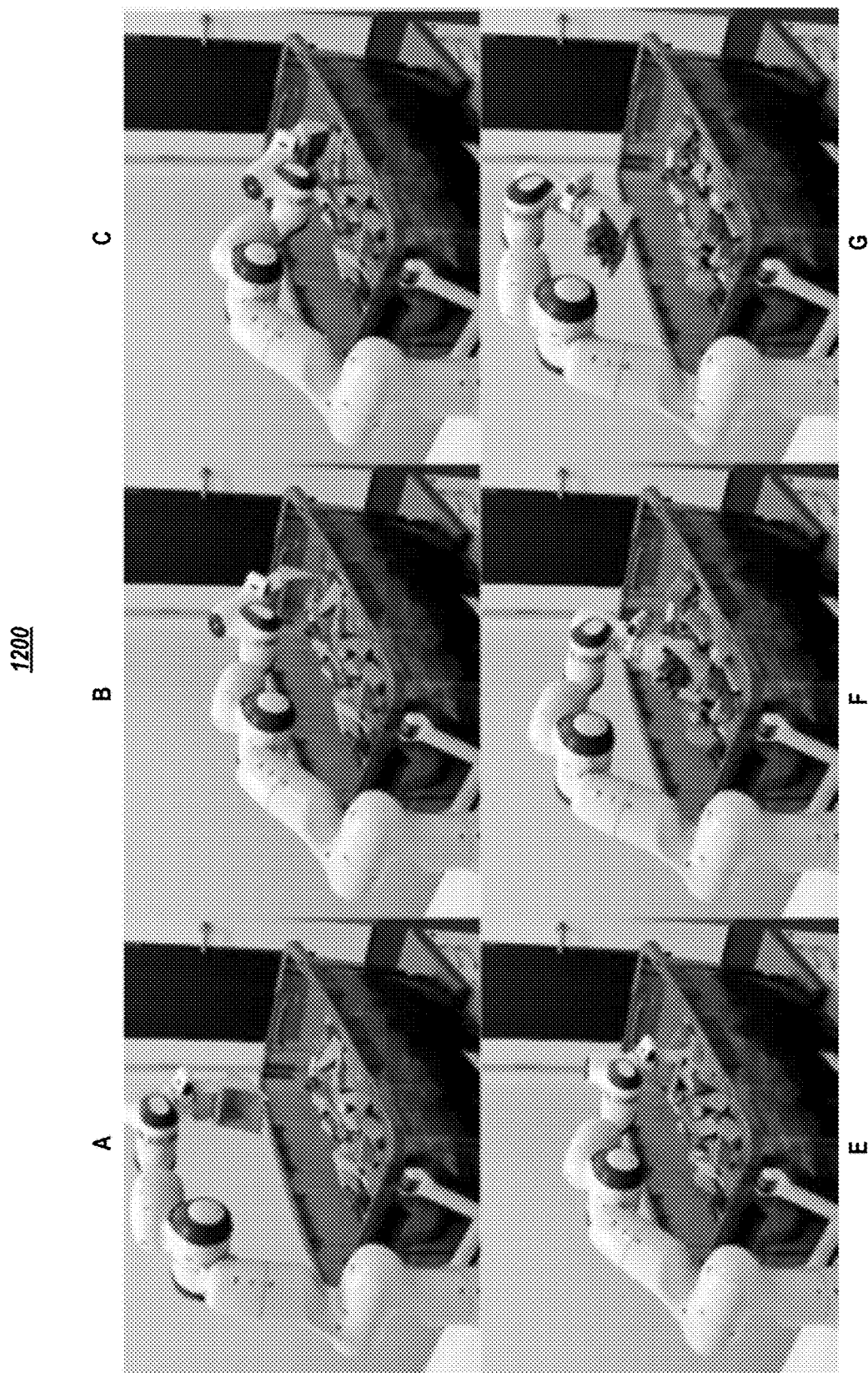
FIG. 12 depicts an imitation learning (IL) trajectory execution on a robot arm, according to embodiments of the present disclosure.

And in FIGS. 11A-C, the final trajectory generated by the IL-STOMP embodiment was plotted on the sand piles. The series of triangles in the graph indicate the series of bucket motions of excavation with the bold line showing the current angle of the bucket. The visualization graph gives an intuition of the method trying to mimic the human operator's behavior, such as aligning the penetration angle along with the trajectory direction, also adjusting movement pace in the time domain during penetrating and dragging the target material. This type of learned pattern was displayed in another trajectory execution on the robot arm, as shown in FIG. 12. The six snapshots (A-F) of the entire excavation were sampled. Starting from the home position (top-left, A), the arm first reaches the POA (top-mid, B), the beginning point of the trajectory. Then it tries to penetrate into the piles (top-right, C), drag the material inside the bucket (bottom-left, D), and close the bucket as the bucket is full (bottom-mid, E). It finishes the trajectory at a fixed given pose (bottom-right, F).

b) IL and STOMP Comparison

The average excavated weight (noted as Avg-W in kg) and the success rate (noted as Suc-R) were used as the evaluation metrics. For this experiment, the sand material was used as the excavation target. The experiment results are shown in TABLE 1. Note that the "Stdev" is the standard deviation of all 15 excavations for each episode, and the two improvement columns under the IL+STOMP embodiment represent the improvements compared with pure-STOMP and pure-IL, respectively.

TABLE I

Experiment performance of different methods

| Epi | Index | pure-STOMP | pure-IL | IL + STOMP value | improvement | |
| --- | --- | --- | --- | --- | --- | --- |
| 1 | Avg-W | 0.763 | 0.905 | 0.969 | 26.96% | 7.15% |
|   | Stdev | 0.176 | 0.193 | 0.148 | −15.59% | −23.09% |
|   | Suc-R | 0.867 | 1.000 | 1.000 | 15.38% | 0.00% |
| 2 | Avg-W | 0.742 | 0.978 | 0.964 | 29.94% | −1.35% |
|   | Stdev | 0.146 | 0.185 | 0.143 | −1.75% | −22.62% |
|   | Suc-R | 0.867 | 1.000 | 1.000 | 15.38% | 0.00% |
| 3 | Avg-W | 0.813 | 0.920 | 0.960 | 18.00% | 4.30% |
|   | Stdev | 0.101 | 0.236 | 0.108 | 6.95% | −54.30% |
|   | Suc-R | 0.800 | 1.000 | 1.000 | 25.00% | 0.00% |
| Total | Avg-W | 0.773 | 0.932 | 0.965 | 24.77% | 3.25% |
|   | Stdev | 0.144 | 0.204 | 0.131 | −8.78% | −35.52% |
|   | Suc-R | 0.844 | 1.000 | 1.000 | 18.42% | 0.00% |

It can be shown that the IL+STOMP embodiment outperformed other methods in terms of both excavation weight and the success rate. Compared with pure-STOMP, IL+STOMP dramatically improved the excavation weight by up to 29.94% in episode 2 and by 24.24% on average. One of the reasons is that, for the STOMP optimization stage, the linear initialization strategy used in pure-STOMP is not as good as the initial trajectory generated by the IL actor in IL+STOMP. STOMP is sensitive to the initial trajectory; different initial trajectories usually lead to different exploration directions thus different final trajectories. Meanwhile, for IL+STOMP and pure-STOMP, the overall standard deviations of the excavated weights are almost the same. This is due to the volume cost in STOMP, which is a dominant objective due to the exponential property. The planned trajectories from both pure-STOMP and IL+STOMP tend to surround the same volume, which reduces the planning variance. The IL+STOMP embodiment succeeds in planning all the trajectories, while the average success rate of pure-STOMP is 84.4%. The failure cases result from bad initial trajectories. As an example, the linear initialized trajectory may not penetrate the terrain, leaving no explore space for STOMP to reduce the volume cost. This further indicates the initial trajectories generated by the IL actor are better than the linear initialization strategy used in pure-STOMP.

Same as IL+STOMP, the success rate of pure-IL is also 100%. In addition, the average excavation weight of the pure-IL method is close to IL+STOMP. However, the performance of pure-IL is not stable. The standard deviation of IL-STOMP is 35.52% better than pure-IL. This may be due to the fact that the demonstration data is limited. The IL actor trained by the limited data cannot cover every terrain state thus introducing errors and disturbances. In fact, the raw trajectory generated by the pure-IL method cannot be applied directly to the real robot since there might be trajectory points that do not satisfy the inverse kinematics. A linear interpolation method was used to make the raw trajectories feasible. In addition, without the STOMP optimization, the volumes surrounded by the trajectories generated by the IL actor usually vary a lot, making the standard deviation of excavation weight relatively large (which can be seen from TABLE 1).

c) Material Model Comparison

As for the comparison of material type, embodiments were compared with the baseline method. The baseline method used a fixed template trajectory and later was optimized using pure STOMP for the purpose of kinematic feasibility. Also, the same denotation was used for the weight and success rate like previous experiment.

TABLE 2

Comparison of generic model and specified model of different materials

| Model | Baseline | Wooden block | | Generic | |
|---|---|---|---|---|---|
| Avg-W | 0.21284 | 0.22882 | 7.69% | 0.22754 | 7.09% |
| Min-W | 0.02530 | 0.12740 | 403.56% | 0.08190 | 223.72% |
| Max-W | 0.39370 | 0.32060 | −18.57% | 0.32160 | −18.31% |
| Stdev | 0.08332 | 0.05127 | −38.47% | 0.05391 | −35.30% |
| Suc-R | 0.5556 | 0.8444 | 52.00% | 0.7442 | 33.95% |

In TABLE 2, it can be seen that the embodiment beat the baseline method easily for 7.69% and 7.09% in terms of average excavation weight accordingly. Both generic model (generic) and specialized model (wooden block) have a lower variance of excavation weight and a better success rate. This is, at least in part, because the baseline model cannot have a good adaption to the terrain when generating the trajectory, while embodiments try to learn the hidden characteristics of terrain excavation and express them in the trajectories generated. For example, embodiments may be more conservative in the rocky terrain because this type of material will incur a higher stuck rate during excavation for the unknown rock distribution under terrain surface, which explains that an embodiment has a lower maximum of excavation weight, but a much higher minimum weight compared to baseline model.

The result shows that the generic model surprisingly achieves a near performance level as the specialized model that has a slightly better average weight. Among the embodiments, the specialized model displayed its proficient capability of finishing the excavation job in its own sophisticated material domain, with a lower excavation weight variance and higher success rate. It showed a stable and strong performance in this relatively difficult material type. The generic model was able to generate similar performance trajectory like the specialized model since it had a close excavation weight, although it still had a small gap in terms of success rate.

D. Some Conclusions

Presented herein were embodiments of an IL and STOMP integrated trajectory planning methodology for autonomous excavators. In one or more embodiments, an IL actor is trained using demonstration trajectories under various terrain states incorporating geometric and material information. Then, a trajectory motion planning model (e.g., a STOMP method) was designed to improve the trajectories generated by the IL actor so that kinematics feasibility is guaranteed, hard constraints are satisfied, smoothness is improved, and the desired volume is approached. Finally, embodiments were tested on a Franka Panda arm and the results showed that the proposed methodology can increase the excavation weights by up to 24.77% compared with pure-IL and pure-STOMP methods.

E. Computing System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smartphone, phablet, tablet, etc.), smartwatch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drive, solid state drive, or both), one or more network ports for communicating with external devices as well as various input and output (I/O) devices, such as a keyboard, mouse, touchscreen, stylus, microphone, camera, trackpad, display, etc. The computing system may also include one or more buses operable to transmit communications between the various hardware components.

Figure 13:
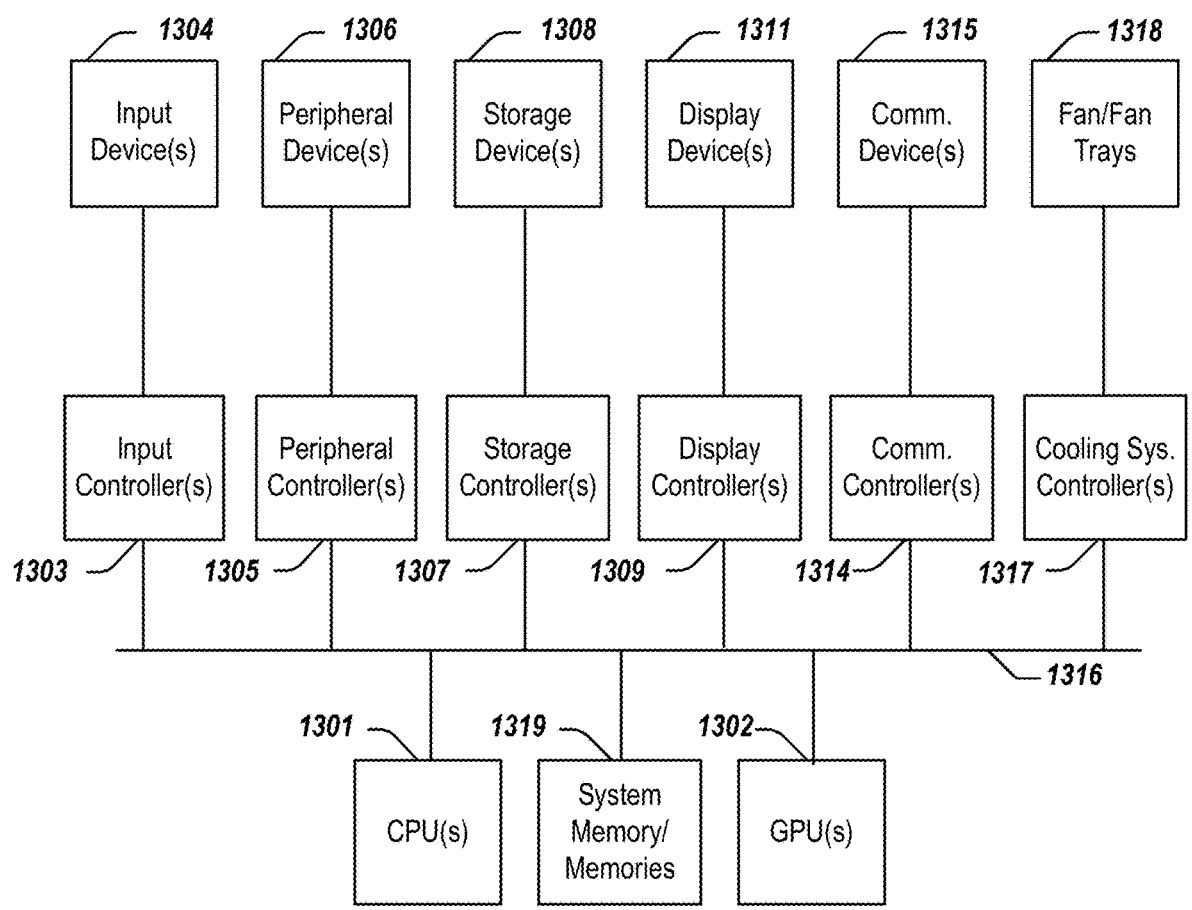
FIG. 13 depicts a simplified block diagram of a computing device/information handling system, according to embodiments of the present disclosure.

FIG. 13 depicts a simplified block diagram of an information handling system (or computing system), according to embodiments of the present disclosure. It will be understood that the functionalities shown for system 1300 may operate to support various embodiments of a computing system—although it shall be understood that a computing system may be differently configured and include different components, including having fewer or more components as depicted in FIG. 13.

As illustrated in FIG. 13, the computing system 1300 includes one or more CPUs 1301 that provide computing resources and control the computer. CPU 1301 may be implemented with a microprocessor or the like, and may also include one or more graphics processing units (GPU) 1302 and/or a floating-point coprocessor for mathematical computations. In one or more embodiments, one or more GPUs 1302 may be incorporated within the display controller 1309, such as part of a graphics card or cards. Thy system 1300 may also include a system memory 1319, which may comprise RAM, ROM, or both.

A number of controllers and peripheral devices may also be provided, as shown in FIG. 13. An input controller 1303 represents an interface to various input device(s) 1304. The computing system 1300 may also include a storage controller 1307 for interfacing with one or more storage devices 1308 each of which includes a storage medium such as magnetic tape or disk, or an optical medium that might be used to record programs of instructions for operating systems, utilities, and applications, which may include embodiments of programs that implement various aspects of the present disclosure. Storage device(s) 1308 may also be used to store processed data or data to be processed in accordance with the disclosure. The system 1300 may also include a display controller 1309 for providing an interface to a display device 1311, which may be a cathode ray tube (CRT) display, a thin film transistor (TFT) display, organic light-emitting diode, electroluminescent panel, plasma panel, or any other type of display. The computing system 1300 may also include one or more peripheral controllers or interfaces 1305 for one or more peripherals 1306. Examples of peripherals may include one or more printers, scanners, input devices, output devices, sensors, and the like. A communications controller 1314 may interface with one or more communication devices 1315, which enables the system 1300 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 1300 comprises one or more fans or fan trays 1318 and a cooling subsystem controller or controllers 1317 that monitors thermal temperature(s) of the system 1300 (or components thereof) and operates the fans/fan trays 1318 to help regulate the temperature.

In the illustrated system, all major system components may connect to a bus 1316, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable media including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that has computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CDs and holographic devices; magneto-optical media; and hardware devices that are specially configured to store or to store and execute program code, such as ASICs, PLDs, flash memory devices, other non-volatile memory devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for training a system to generate a trajectory, the method comprising:
   using an actor neural network, which receives a state as an input, to obtain an initial trajectory shape;
   using the initial trajectory shape as an input into a trajectory motion planning model to obtain an operational trajectory;

checking whether the initial trajectory shape is acceptable;

responsive to the initial trajectory shape not being acceptable, having a human generate a human-demonstrated trajectory for the state;

having a robot execute an execution trajectory that is either the operational trajectory or the human-demonstrated trajectory;

after execution, evaluating the execution trajectory and assigning a value to it;

storing a set of data comprising the state, the execution trajectory, and the value as new demonstration data; and updating the actor neural network using an aggregated demonstration data, wherein the actor neural network is initially pre-trained using an original set of demonstration data, and the aggregated demonstration data set comprises the new demonstration data and the original set of demonstration data.

2. The computer-implemented method of claim 1 wherein the trajectory motion planning model comprises:

a stochastic trajectory optimization for motion planning (STOMP) optimization model.

3. The computer-implemented method of claim 2 wherein the STOMP optimization model considers the robot's one or more kinematic models to consider feasibility of the operational trajectory and further comprises one or more:

one or more hard constraints;

a smoothness of the operational trajectory; and one or more user-defined objectives.

4. The computer-implemented method of claim 2 wherein the STOMP optimization model is trained using a trajectory-based cost function.

5. The computer-implemented method of claim 1 further comprising:

repeating the steps of claim 1, in which a new state is obtain for each iteration, until a stop condition is reached; and outputting a trained actor neural network.

6. The computer-implemented method of claim 1 wherein the step of updating the actor neural network comprises:

training the actor neural network to minimize a mean square error (MSE) between demonstration trajectories and predicted trajectories.

7. The computer-implemented method of claim 1 wherein the state comprises a set of one or more features obtained from a terrain point cloud that relate to geometric shape of a terrain and a set of one or more features obtained from an image classifier that relate to material composition of the terrain.

8. The computer-implemented method of claim 1 wherein the execution trajectory is for excavation.

9. A system comprising:

one or more processors; and a non-transitory computer-readable medium or media comprising one or more sets of instructions which, when executed by at least one of the one or more processors, causes steps to be performed comprising:

using an actor neural network, which receives a state as an input, to obtain an initial trajectory shape;

using the initial trajectory shape as an input into a trajectory motion planning model to obtain an operational trajectory;

checking whether the initial trajectory shape is acceptable;

responsive to the initial trajectory shape not being acceptable, having a human generate a human-demonstrated trajectory for the state;

having a robot execute an execution trajectory that is either the operational trajectory or the human-demonstrated trajectory;

after execution, evaluating the execution trajectory and assigning a value to it;

storing a set of data comprising the state, the execution trajectory, and the value as new demonstration data; and updating the actor neural network using an aggregated demonstration data set, wherein the actor neural network is initially pre-trained using an original set of demonstration data, and the aggregated demonstration data set comprises the new demonstration data and the original set of demonstration data.

10. The system of claim 9 wherein the trajectory motion planning model comprises:

a stochastic trajectory optimization for motion planning (STOMP) optimization model.

11. The system of claim 10 wherein the STOMP optimization model considers the robot's one or more kinematic models to consider feasibility of the operational trajectory and further comprises one or more:

one or more hard constraints;

a smoothness of the operational trajectory; and one or more user-defined objectives.

12. The system of claim 10 wherein the STOMP optimization model is trained using a trajectory-based cost function.

13. The system of claim 9 wherein the non-transitory computer-readable medium or media further comprises one or more sequences of instructions which, when executed by at least one of the one or more processors, causes steps to be performed comprising:

repeating the steps of claim 9, in which a new state is obtain for each iteration, until a stop condition is reached; and outputting a trained actor neural network.

14. The system of claim 9 wherein the step of updating the actor neural network comprises:

training the actor neural network to minimize a mean square error (MSE) between demonstration trajectories and predicted trajectories.

15. The system of claim 9 wherein the state comprises a set of one or more features obtained from a terrain point cloud that relate to geometric shape of a terrain and a set of one or more features obtained from an image classifier that relate to material composition of the terrain.

16. A computer-implemented method for generating a trajectory, the method comprising:

inputting a state into a two-stage trajectory generating system comprising a trained actor neural network that was trained using imitation learning and a model-based trajectory motion planner;

using the trained actor neural network, which receives the state as an input, to obtain an initial trajectory shape;

using the initial trajectory shape as an input into a model-based trajectory motion planner to obtain an execution trajectory; and providing the execution trajectory for use with a device that is to execute the execution trajectory.

17. The computer-implemented method of claim 16 wherein the model-based trajectory motion planner comprises:

a stochastic trajectory optimization for motion planning (STOMP) optimization model.

18. The computer-implemented method of claim 16 wherein the state comprises a set of one or more features obtained from a terrain point cloud that relate to geometric shape of a terrain and a set of one or more features obtained from an image classifier that relate to material composition of the terrain.

* * * * *